United States Patent [19]
Guerci

[11] Patent Number: 6,002,807
[45] Date of Patent: *Dec. 14, 1999

[54] ROTATIONALLY INVARIANT CORRELATOR

[75] Inventor: Joseph R. Guerci, Astoria, N.Y.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/583,923

[22] Filed: Jan. 11, 1996

[51] Int. Cl.⁶ .................. G06K 9/62; G06K 15/316; G06K 15/332; G06F 17/15
[52] U.S. Cl. .................. 382/278; 382/116; 382/124; 382/209; 382/280; 364/728.02; 364/728.03
[58] Field of Search .................. 382/124, 125, 382/209, 212, 278, 280, 127, 192, 199, 116, 296; 364/487, 728.02, 728.03

[56] References Cited

U.S. PATENT DOCUMENTS

| | | | |
|---|---|---|---|
| 3,074,634 | 1/1963 | Gamo | 382/280 |
| 3,944,978 | 3/1976 | Jensen et al. | 382/127 |
| 4,267,573 | 5/1981 | Chaikin et al. | 382/296 |
| 4,802,230 | 1/1989 | Horowitz | 382/199 |
| 5,276,629 | 1/1994 | Reynolds | 364/487 |
| 5,359,670 | 10/1994 | Hunt | 382/278 |
| 5,426,708 | 6/1995 | Hamada et al. | 382/125 |
| 5,465,303 | 11/1995 | Levison et al. | 382/124 |
| 5,812,252 | 9/1998 | Bowker et al. | 382/116 |

Primary Examiner—Phuoc Tran
Assistant Examiner—Daniel G. Mariam
Attorney, Agent, or Firm—Terry J. Anderson; Karl J. Hoch, Jr.

[57] ABSTRACT

A rotationally invariant correlator which correlates an arbitrarily rotated image with a large database of similar stored images. The correlator initially scans the image to produce a two-dimensional array of pixels representative thereof. A plurality of concentric rings of pixel data are then produced from the two-dimensional array of pixels. A Fast Fourier Transform is taken of each ring of pixel data which produces an amplitude spectra of the frequency components of that ring of pixel data, which is then normalized. The normalized amplitude spectra for the image being correlated is then compared with normalized amplitude spectra of similar rings of pixel data for similar images in memory, and any matches are identified. The width of each ring of pixel data is selected to be smaller than the size of the smallest features which are to be resolved, while being sufficiently wide to smooth out extraneous noise. Several of the processing steps for each ring of pixel data are performed in parallel in parallel processing arrangements.

30 Claims, 2 Drawing Sheets

ROTATIONALLY INVARIANT CORRELATOR

BACKGROUND OF THE INVENTION

1. Field of the Invention

The present invention relates generally to a rotationally invariant correlator, and more particularly pertains to a rotationally invariant correlator which is designed to correlate an arbitrarily rotated image with a large database of similar stored images.

2. Discussion of the Prior Art

The present invention was invented to solve a particular problem faced by the Federal Bureau of Investigation (FBI) in their "Drug Fire" program, whereby the unique features of the physical impression made by a firing pin of a particular firearm weapon on the firing ring (cartridge primer) of a bullet casing is used to identify the particular weapon which fired that bullet. The present invention was conceived to analyze and match the characteristics of a firing ring of a discharged or fired bullet cartridge with the characteristics of firing rings of discharged bullet cartridges in memory to determine if a match can be made. Each gun has a firing pin which impacts against the firing ring or cartridge primer of a bullet cartridge to discharge or fire the bullet. Each gun and firing pin creates a slightly different pattern in the firing ring of a bullet cartridge which is a characteristic signature (fingerprint) of that gun. Thus, by analyzing the pattern in the firing ring of a discharged bullet cartridge, and comparing it with the patterns in the firing rings of other discharged bullet cartridges, one can determine if the same gun fired two different discharged bullet cartridges.

A conventional image matching technique applied to the above correlation situation would produce a Fast Fourier Transform (FFT) for the entire image of the firing ring of the discharged bullet cartridge and compare it with Fast Fourier Transforms in memory for images of firing rings of discharged bullet cartridges. This conventional image matching technique is very time consuming compared with the rotationally invariant correlator of the present invention. The reduction in complexity of the rotationally invariant correlator of the present invention when compared with conventional image matching techniques can be quite dramatic. For example, assume that an image consists of $N^2$ pixels, which is to be compared against a library of M images. Since the rotation of the image is unknown, the image to be compared must be quantized into n possible rotations. Therefore, in conventional image matching, an order of $n \times M \times N^2$ image matching correlating operations must be performed. With the present invention, the number of image matching operations is reduced by a factor of n. For example, if n=360 (one degree steps), the complexity and number of correlations is reduced by over two orders of magnitude. In one test, the present invention accomplished image matching in a database in 90 seconds, compared with 30 hours of image matching in the same database using the above conventional image matching technique.

SUMMARY OF THE INVENTION

Accordingly, it is a primary object of the present invention to provide a rotationally invariant correlator and method of correlation which correlates an arbitrarily rotated image with a large database of similar stored images.

A further object of the subject invention is the provision of a rotationally invariant correlator and method of correlation which produces or extricates a series of concentric rings of data from a scanned and digitized image which form one-dimensional data lines. The concentric rings of data are normally produced by a digital processor by sampling concentric rings of data on the digitized image. However, it is also possible in some embodiments to directly produce the concentric rings of data by direct annular scans of the image of interest. A Fourier Transform is produced for each data line, and each Fourier Transform, which is an amplitude spectra of the frequency components of that data line, is then matched against corresponding template data for similar images which are stored in memory in a database.

Unlike conventional existing image matching techniques faced with an arbitrary rotation of an image, the present invention removes the effects of rotation by a unique extrication of circular rings of data from the image which, when Fourier transformed, eliminates the effects of rotation on the resulting amplitude spectra produced by the Fourier transformation. The amplitude spectra from the rings of data are then compared against the amplitude spectra for rings of data stored in memory in a stored database to effect a match. The computational savings associated with this approach can be enormous when compared with conventional prior art correlation approaches.

The present invention has utility in situations wherein image correlation needs to be performed in the presence of an arbitrary rotation of an input image. The present invention results in a dramatic reduction in complexity of processing required to match an arbitrarily rotated image against a large database of similar stored images.

In accordance with the teachings herein, the present invention provides a rotationally invariant correlator and method of image correlation in which an image is scanned to produce a two-dimensional array of pixels representative thereof, and at least one ring of pixel data is produced therefrom. A Fast Fourier Transform is taken of each ring of pixel data, which is compared with Fast Fourier Transforms of similar rings of pixel data stored in a database, and any match is identified.

In greater detail, in a preferred embodiment, a plurality of concentric rings of data are produced from the two-dimensional array of pixels. Moreover, the steps of taking, comparing and identifying are performed in parallel in parallel processing arrangements for each ring of pixel data. The two-dimensional array of pixels is initially analyzed to determine the center of the two-dimensional array of pixels, around which the rings of data are taken. Alternatively, the center of the image can be designated in the input to the processing computer. The Fast Fourier Transform produces an amplitude spectra of the frequency components of each ring of data, and the amplitude spectra of each ring of data is normalized. The normalized amplitude spectra is then compared with the normalized amplitude spectra of similar images in memory. The selected width of each data line depends upon the size of the smallest features which are to be resolved, with the width of each data line being smaller than the smallest features to be resolved. On the other hand, the selected width of each data line is chosen to be sufficiently wide to smooth out extraneous noise.

BRIEF DESCRIPTION OF THE DRAWINGS

The foregoing objects and advantages of the present invention for a rotationally invariant correlator may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figures 1, 2:
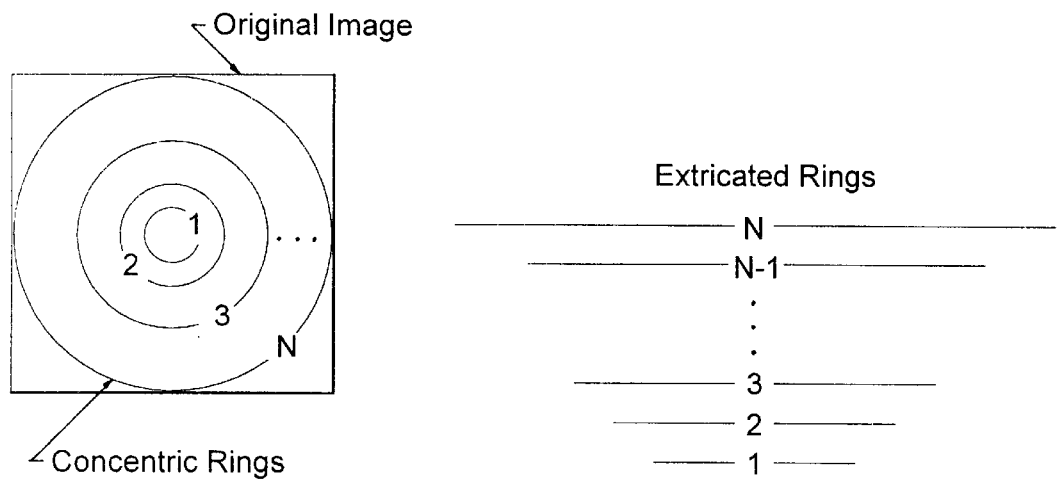
FIG. 1 illustrates an image which is to be analyzed pursuant to the teachings of the present invention wherein the image is scanned to produce a two-dimensional array of pixels, and then one or more circular rings of data are produced from the two-dimensional array of pixels representative of the image.
FIG. 2 illustrates the concentric rings of data 1, 2, 3 . . . N, wherein the data in each concentric ring 1, 2, 3 . . . N is shown as essentially a one-dimensional scan of the data.

Referring to the drawings in detail, FIG. 1 illustrates an image 10 which is to be analyzed pursuant to the teachings of the present invention, in which the image is initially scanned to produce a two-dimensional array of pixels representative thereof. Then one or more circular rings of data are produced from the array of pixels representative of the image. Referring to FIG. 1, the image is analyzed by concentric rings of data 1, 2, 3 . . . N. The data in each concentric ring 1, 2, 3 . . . N is then essentially a one-dimensional scan of data, as illustrated by FIG. 2, which shows one-dimensional data lines 1, 2, 3 . . . N.

Figure 3:
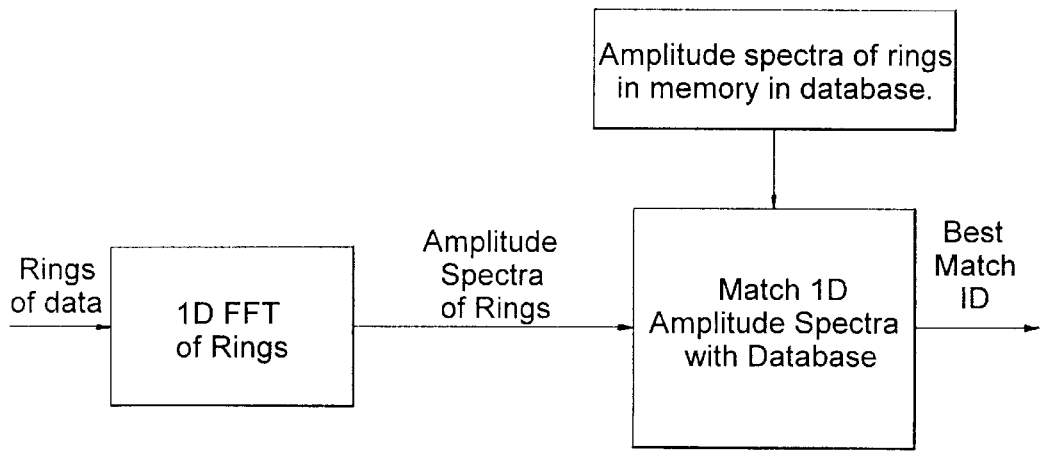
FIG. 3 is a block diagram wherein a Fast Fourier Transform (FFT) is produced for each one-dimensional data line 1, 2, 3 . . . N, and each Fourier Transform, which is an amplitude spectra of the frequency components of each line of data, is then matched against corresponding templates of data for similar images of interest which are stored in memory in a database.

As indicated in FIG. 3, a Fourier Transform is then produced for each one-dimensional data line 1, 2, 3 . . . N, and each Fourier Transform, which is an amplitude spectra of the frequency components of each data line, is then matched against corresponding template data for similar images which are stored in memory in a database.

The present invention produces or extricates a series of concentric rings of data from an image by sampling imaginary concentric rings of data in the digitized image. The concentric rings of data are preferably separated by at least one or two pixels (so as to prevent overlap), but in some alternative embodiments, some overlap of adjacent rings may be desirable. A computer, using known data processing techniques, can readily produce the concentric data rings or lines. The selected width of each data line depends upon the size of the smallest features to be resolved, as well as the amount of local smoothing required to filter extraneous noise. The width of each data line should be smaller than the smallest features to be resolved, while being sufficiently wide to smooth out extraneous noise. The defined width places an upper limit on the number of data rings, while the lower limit on the number of data rings is the extreme case of a single data ring.

A Fast Fourier Transform (FFT) is produced for each one-dimensional data line 1, 2, 3 . . . N, which produces amplitude spectra of the fequency components of each line of data. Rotation of the image causes a circular shift in the data ring, but the resulting FFT amplitude spectrum is unaffected by the rotation (only the phase of the FFT is affected) by a well known property of discrete Fourier Transforms. Stated differently, each one-dimensional data line would contain the same frequency components, and therefore produce the same Fast Fourier Transform, regardless of where the ring of data is started or ended to produce the one-dimensional data line. Lastly, the FFT amplitude spectra of the rings are compared against a stored library of amplitude spectra for similar rings to effect a match. This can be accomplished by any of several well known data processing approaches (e.g., maximum likelihood, least squares, sum-squared, sum-absolute, etc.).

Figure 4:
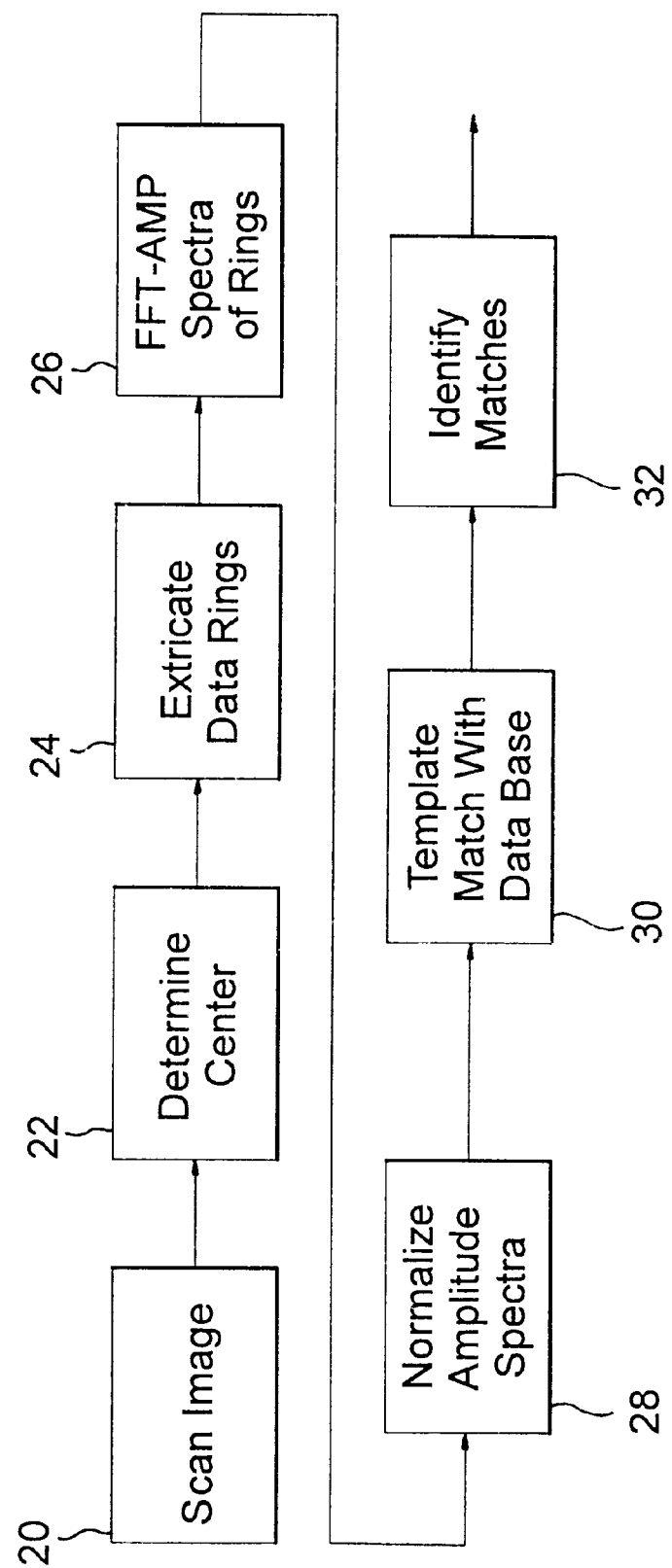
FIG. 4 is a diagram of the sequential steps involved in practicing the rotationally invariant correlation process pursuant to the teachings of the present invention.

FIG. 4 is a diagram of the sequential steps involved in practicing the rotationally invariant correlation process pursuant to the teachings of the present invention. Initially, the image is scanned at 20 to produce an array of pixels representative of the image which is placed in the memory of a computer. Then, using conventional known data processing techniques, the image is analyzed by the computer at 22 to determine the center of the image. Alternatively, the center of the image can be designated in the input data to the computer. Next, the rings of data are produced at 24 from the image in the computer, again by using known data processing techniques. From this point in the process forward, the operations can be performed in parallel for each data ring, as in parallel processors. A Fast Fourier Transform is taken for each data ring at 26, to obtain amplitude spectra (on the frequency components) of each data ring. The amplitude spectra is then normalized at 28 to minimize the adverse effects of sampling the different data under varying and different conditions. The normalized amplitude spectra is then correlated at 30 by template matching with normalized amplitude spectra of other data rings for similar images stored in a database.

The correlation or comparison can use the known data processing operations of sum-squared operations or sum-absolute operations, or any similar known data processing operation which produces a measurement of how close of a match is obtained.

Each ring of data can be processed in parallel in a highly parallel processor. Moreover, the processing can implement known data processing techniques and operations, such as techniques for data compression and techniques for noise reduction.

Once a data match is recognized, the phase ($\phi$) of the circular rings of data can be determined. As a matter of background, the physical impression made by a firing pin on a firing ring normally produces a bar mark, which for purposes of standardization, the prior art has oriented in a horizontal position at a 3 o'clock position.

While several embodiments and variations of the present invention for a rotationally invariant correlator are described in detail herein, it should be apparent that the disclosure and teachings of the present invention will suggest many alternative designs to those skilled in the art.

What is claimed is:

1. A rotationally invariant method of image correlation comprising:
    a. scanning an image being correlated to produce a set of pixels representative thereof, wherein each of the pixels has a data value;
    b. storing the pixel data values in a computer memory;
    c. using a processor means to identify at least one ring of pixels and the data values for each ring of pixels, wherein the data values for each ring of pixels form a respective ring of pixel data;
    d. taking the Fast Fourier Transform of each ring of pixel data;
    e. storing in memory in a database Fast Fourier Transforms of rings of pixel data for similar images;

f. comparing and correlating the Fast Fourier Transform of each ring of pixel data for the image being correlated with Fast Fourier Transforms of rings of pixel data stored in the database; and g. identifying any match of the Fast Fourier Transform of each ring of pixel data for the image being correlated with the Fast Fourier Transforms of rings of pixel data stored in the database.

2. A rotationally invariant method of image correlation as claimed in claim 1, wherein said scanning step produces a two-dimensional array of pixels representative of the image being correlated, and the at least one ring of pixel data is produced from the two-dimensional array of pixels.

3. A rotationally invariant method of image correlation as claimed in claim 1, wherein said step of using comprises producing a plurality of concentric rings of pixel data from the two-dimensional array of pixels.

4. A rotationally invariant method of image correlation as claimed in claim 1, wherein said steps of taking, comparing and identifying are performed in parallel for each ring of pixel data.

5. A rotationally invariant method of image correlation as claimed in claim 1, including the step of analyzing the two-dimensional array of pixels to determine the center of the two-dimensional array of pixels.

6. A rotationally invariant method of image correlation as claimed in claim 1, wherein said step of taking the Fast Fourier Transform produces amplitude spectra of the frequency components of each ring of pixel data, and further including the step of normalizing the amplitude spectra of the frequency components of each ring of pixel data, and the normalized amplitude spectra is compared with the normalized amplitude spectra of images in memory.

7. A rotationally invariant method of image correlation as claimed in claim 1, wherein the width of each ring of pixel data is selected in dependence upon the size of the smallest features which are to be resolved, with the width of each ring of pixel data being smaller than the smallest features to be resolved, while being sufficiently wide to smooth out extraneous noise.

8. A rotationally invariant method of image correlation as claimed in claim 2, including the step of analyzing the two-dimensional array of pixels to determine the center of the two-dimensional array of pixels.

9. A rotationally invariant method of image correlation as claimed in claim 2, wherein said step of producing comprises producing a plurality of concentric rings of pixel data from the two-dimensional array of pixels.

10. A rotationally invariant method of image correlation as claimed in claim 9, wherein said steps of taking, comparing and identifying are performed in parallel for each ring of pixel data.

11. A rotationally invariant method of image correlation as claimed in claim 10, including the step of analyzing the two-dimensional array of pixels to determine the center of the two-dimensional array of pixels.

12. A rotationally invariant method of image correlation as claimed in claim 11, wherein said step of taking the Fast Fourier Transform produces an amplitude spectra of the frequency components of each ring of pixel data, and further including the step of normalizing the amplitude spectra of the frequency components of each ring of pixel data, and the normalized amplitude spectra is compared with the normalized amplitude spectra of images in memory.

13. A rotationally invariant method of image correlation as claimed in claim 12, wherein the width of each ring of pixel data is selected in dependence upon the size of the smallest features which are to be resolved, with the width of each ring of pixel data being smaller than the smallest features to be resolved, while being sufficiently wide to smooth out extraneous noise.

14. A rotationally invariant method of image correlation as claimed in claim 13, including the step of analyzing the two-dimensional array of pixels to determine the center of the two-dimensional array of pixels.

15. A rotationally invariant image correlator comprising:

a. means for scanning an image being correlated to produce a set of pixels representative of the image being correlated, wherein each of the pixels has a data value;

b. a computer memory for storing the pixel data values;

c. a processor means to identify at least one ring of pixels and the data values for each ring of pixels, wherein the data values for each ring of pixels form a respective ring of pixel data;

d. Fast Fourier Transform means for taking the Fast Fourier Transform of each ring of pixel data; and e. a memory database having stored therein Fast Fourier Transforms of rings of pixels data from similar images;

wherein the processor means includes means for comparing and correlating the Fast Fourier Transform of each ring of pixel data for the image being correlated with the Fast Fourier Transforms of rings of pixel data stored in said memory databases and for identifying any matches of the Fase Fourier Transform, of each ring of pixel data for the image being correlated, with the Fast Fourier Transforms of rings of pixel data stored in the database.

16. A rotationally invariant image correlator as claimed in claim 15, wherein:

a. said means for scanning produces a two-dimensional array of pixels for the image being correlated; and b. said processor means produces the at least one ring of pixel data from the two-dimensional array of pixels.

17. A rotationally invariant image correlator as claimed in claim 15, wherein said processor means produces a plurality of concentric rings of pixel data from the two-dimensional array of pixels.

18. A rotationally invariant image correlator as claimed in claim 15, wherein said processor means performs data processing operations in parallel for each ring of pixel data for the image being correlated.

19. A rotationally invariant image correlator as claimed in claim 15, wherein said processor means analyzes the two-dimensional array of pixels to determine the center of the two-dimensional array of pixels.

20. A rotationally invariant image correlator as claimed in claim 15, wherein:

a. said Fast Fourier Transform means produces amplitude spectra of the frequency components of each ring of pixel data for the image being correlated;

b. the processing means further including means for normalizing the amplitude spectra of the frequency components of each ring of pixel data for the image being correlated; and c. the memory database has stored therein normalized amplitude spectra for similar images, with which the normalized amplitude spectra of the image being correlated is compared.

21. A rotationally invariant image correlator as claimed in claim 15, wherein the processor means produces a selected width ring of pixel data, wherein the selected width of the ring of pixel data is smaller than the smallest features to be resolved, while being sufficiently wide to smooth out extraneous noise.

22. A rotationally invariant image correlator as claimed in claim 16, wherein said processor means analyzes the two-dimensional array of pixels to determine the center of the two-dimensional array of pixels.

23. A rotationally invariant image correlator as claimed in claim 16, wherein said processor means produces a plurality of concentric rings of pixel data from the two-dimensional array of pixels.

24. A rotationally invariant image correlator as claimed in claim 23, wherein said processor means performs data processing operations in parallel for each ring of pixel data for the image being correlated.

25. A rotationally invariant image correlator as claimed in claim 24, wherein said processor means analyzes the two-dimensional array of pixels to determine the center of the two-dimensional array of pixels.

26. A rotationally invariant image correlator as claimed in claim 25, wherein:
 a. said Fast Fourier Transform means produces amplitude spectra of the frequency components of each ring of pixel data for the image being correlated;
 b. the processing means further including means for normalizing the amplitude spectra of the frequency components of each ring of pixel data for the image being correlated; and
 c. the memory database has stored therein normalized amplitude spectra for similar images, with which the normalized amplitude spectra of the image being correlated is compared.

27. A rotationally invariant image correlator as claimed in claim 26, wherein the processor means produces a selected width ring of pixel data, wherein the selected width of the ring of pixel data is smaller than the smallest features to be resolved, while being sufficiently wide to smooth out extraneous noise.

28. A rotationally invariant image correlator as claimed in claim 27, wherein said processor means analyzes the two-dimensional array of pixels to determine the center of the two-dimensional array of pixels.

29. A rotationally invariant method of image correlation as claimed in claim 1, wherein said scanning step scans an unknown and irregular image.

30. A rotationally invariant image correlator as claimed in claim 15, wherein said means for scanning scans an unknown and irregular image.

* * * * *